(12) United States Patent
Al-Hajji et al.

(10) Patent No.: US 9,637,689 B2
(45) Date of Patent: May 2, 2017

(54) PROCESS FOR REDUCING THE TOTAL ACID NUMBER IN REFINERY FEEDSTOCKS

(75) Inventors: Adnan Al-Hajji, Dhahran (SA); Omer Refa Koseoglu, Dhahran (SA); Hendrik Muller, Dhahran (SA); Hanadi Al Jawad, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 740 days.

(21) Appl. No.: 13/560,377

(22) Filed: Jul. 27, 2012

(65) Prior Publication Data

US 2013/0037448 A1 Feb. 14, 2013

Related U.S. Application Data

(60) Provisional application No. 61/513,042, filed on Jul. 29, 2011.

(51) Int. Cl.
| | |
|---|---|
| *C10G 29/02* | (2006.01) |
| *C10G 29/16* | (2006.01) |
| *C10G 19/02* | (2006.01) |
| *B01J 37/06* | (2006.01) |
| *B01J 23/00* | (2006.01) |
| *B01J 23/06* | (2006.01) |
| *B01J 27/236* | (2006.01) |
| *C10G 25/00* | (2006.01) |

(52) U.S. Cl.
CPC ............ *C10G 19/02* (2013.01); *B01J 23/007* (2013.01); *B01J 23/06* (2013.01); *B01J 27/236* (2013.01); *B01J 37/06* (2013.01); *C10G 25/003* (2013.01); *C10G 29/16* (2013.01); *C10G 2300/203* (2013.01); *C10G 2300/4006* (2013.01); *C10G 2300/4012* (2013.01); *C10G 2300/4018* (2013.01); *C10G 2300/80* (2013.01)

(58) Field of Classification Search
CPC ................................. C10G 29/02; C10G 29/16
See application file for complete search history.

(56) References Cited

U.S. PATENT DOCUMENTS

| | | | |
|---|---|---|---|
| 2,808,431 A | 10/1957 | Fierce | |
| 2,988,500 A | 6/1961 | Gleim et al. | |
| 4,049,543 A | 9/1977 | Bergholm | |
| 4,098,717 A * | 7/1978 | Buriks et al. | 516/183 |
| 4,124,531 A | 11/1978 | Frame | |
| 4,199,440 A | 4/1980 | Verachtert | |
| 4,290,917 A | 9/1981 | Carlson | |
| 4,300,995 A | 11/1981 | Liotta | |
| 4,392,947 A | 7/1983 | Audeh et al. | |
| 4,582,629 A | 4/1986 | Wolf | |
| 4,626,341 A | 12/1986 | Verachtert | |
| 4,647,366 A | 3/1987 | Edmondson | |
| 4,675,100 A * | 6/1987 | Maple et al. | 208/203 |
| 4,853,119 A | 8/1989 | Wolf et al. | |
| 5,011,579 A | 4/1991 | Davis | |
| 5,182,013 A | 1/1993 | Petersen et al. | |
| 5,389,240 A * | 2/1995 | Gillespie et al. | 208/226 |
| 5,871,838 A | 2/1999 | Klett et al. | |
| 5,891,325 A | 4/1999 | Bearden et al. | |
| 5,897,769 A | 4/1999 | Trachte et al. | |
| 5,904,839 A | 5/1999 | Brons | |
| 5,910,242 A | 6/1999 | Halbert et al. | |
| 5,914,030 A | 6/1999 | Bearden et al. | |
| 5,928,502 A | 7/1999 | Bearden et al. | |
| 5,961,821 A | 10/1999 | Varadaraj et al. | |
| 5,985,137 A | 11/1999 | Ohsol et al. | |
| 6,027,636 A | 2/2000 | Poirier | |
| 6,030,523 A | 2/2000 | Varadaraj et al. | |
| 6,054,042 A | 4/2000 | Gorbaty et al. | |
| 6,063,266 A | 5/2000 | Grande et al. | |
| 6,086,751 A | 7/2000 | Bienstock et al. | |
| 6,096,196 A | 8/2000 | Varadaraj et al. | |
| 6,184,427 B1 | 2/2001 | Klepfer et al. | |
| 6,190,541 B1 | 2/2001 | Siskin et al. | |
| 6,258,258 B1 | 7/2001 | Sartori et al. | |
| 6,454,936 B1 | 9/2002 | Varadaraj | |
| 6,464,859 B1 | 10/2002 | Duncum et al. | |
| 6,531,055 B1 | 3/2003 | Greaney | |
| 6,627,069 B2 | 9/2003 | Greaney | |
| 6,679,987 B1 * | 1/2004 | Blum et al. | 208/263 |

(Continued)

FOREIGN PATENT DOCUMENTS

| | | |
|---|---|---|
| EP | 0203574 A2 | 12/1986 |
| EP | 0831096 A2 | 3/1998 |
| WO | 0179386 A2 | 5/2001 |

OTHER PUBLICATIONS

PCT Application PCT/US2012/048577, International Search Report and Written Opinion dated Jan. 28, 2013 (13 pages).

*Primary Examiner* — Randy Boyer

(74) *Attorney, Agent, or Firm* — Abelman, Frayne & Schwab

(57) ABSTRACT

A process is described for reducing the total acid number of a refinery feedstock. In one embodiment, refinery feedstock containing naphthenic acids is contacted with an effective amount of solid catalyst in the presence of an aqueous caustic base, wherein the caustic base is sodium hydroxide or potassium hydroxide, for a period of time sufficient to neutralize at least a portion of the naphthenic acids in the feedstock. Thereafter, the aqueous phase is separated from the neutralized refinery feedstock. In another embodiment catalyst is pretreated with a caustic base solution and contacted with refinery feedstock to reducing the total acid number.

15 Claims, 1 Drawing Sheet

(56) References Cited

U.S. PATENT DOCUMENTS

| | | |
|---|---|---|
| 7,207,445 B2 | 4/2007 | Manna et al. |
| 7,507,329 B2 | 3/2009 | Pinho et al. |
| 7,514,657 B2 | 4/2009 | Moreira et al. |
| 7,534,342 B2 | 5/2009 | Bhan et al. |
| 2002/0125175 A1 | 9/2002 | Collins et al. |
| 2004/0026299 A1 | 2/2004 | Chamberlain et al. |
| 2005/0161371 A1 | 7/2005 | Marr et al. |
| 2006/0016723 A1 | 1/2006 | Tang et al. |
| 2006/0043003 A1 | 3/2006 | Moreira et al. |
| 2006/0054538 A1 | 3/2006 | Hsu et al. |
| 2006/0091044 A1 | 5/2006 | Lehrer et al. |
| 2006/0249430 A1 | 11/2006 | Mesters |
| 2006/0254930 A1 | 11/2006 | Martinie et al. |
| 2006/0272983 A1 | 12/2006 | Droughton et al. |
| 2007/0000810 A1 | 1/2007 | Bhan et al. |
| 2007/0000811 A1 | 1/2007 | Bhan et al. |
| 2007/0298505 A1 | 12/2007 | Smith et al. |
| 2008/0164137 A1 | 7/2008 | Messer et al. |
| 2009/0236263 A1 | 9/2009 | Babic-Samardzija et al. |

\* cited by examiner

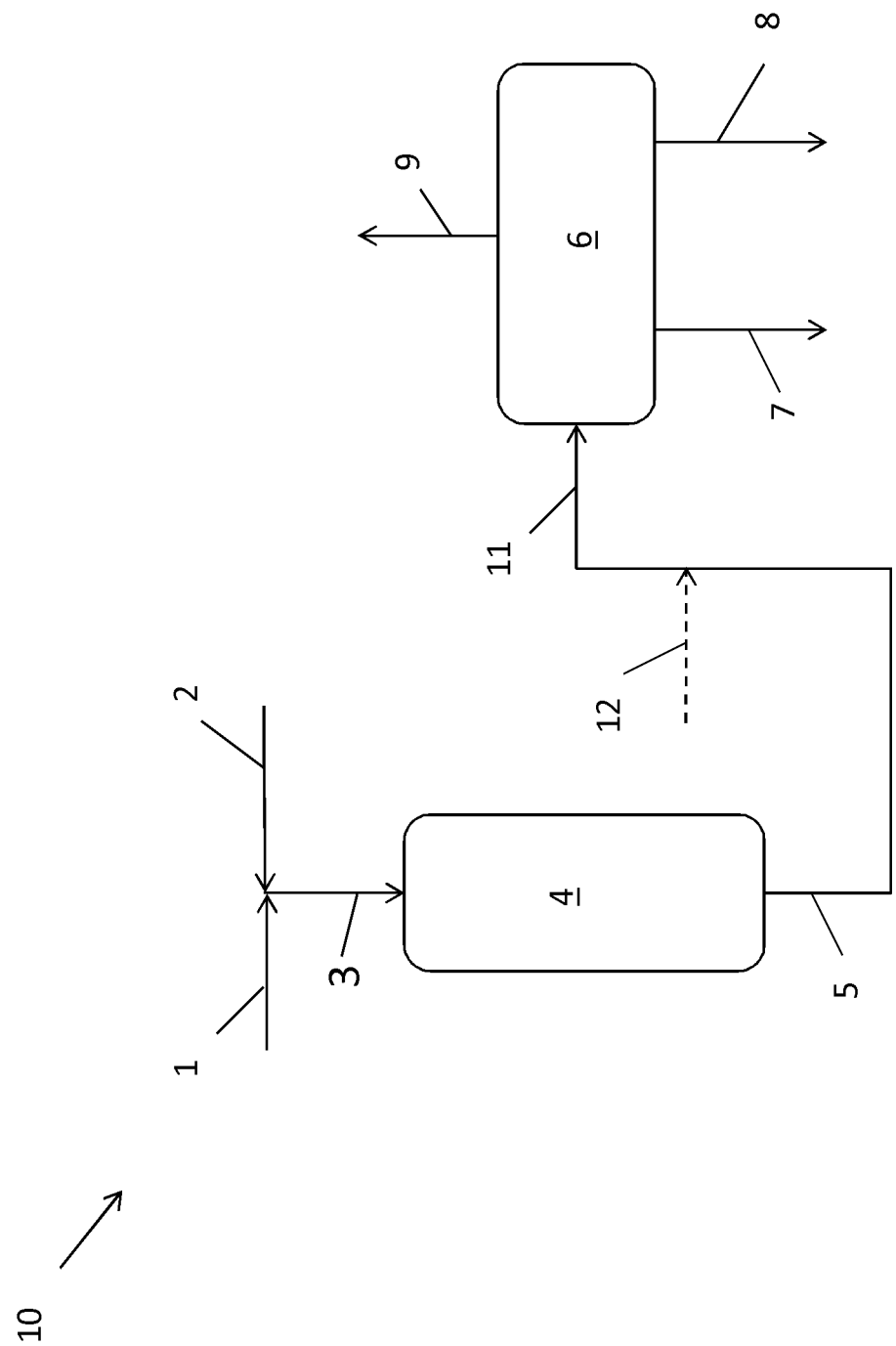

PROCESS FOR REDUCING THE TOTAL ACID NUMBER IN REFINERY FEEDSTOCKS

RELATED APPLICATIONS

This application claims the benefit of U.S. Provisional Patent Application No. 61/513,042 filed Jul. 29, 2011, the disclosure of which is hereby incorporated by reference in its entirety.

BACKGROUND OF THE INVENTION

Field of the Invention

The present invention relates to upgrading refinery feedstocks, in particular to reduce the total acid number by neutralizing naphthenic acids.

Description of Related Art

Compositions of natural petroleum or crude oils vary significantly based on numerous factors, mainly the geographic source, and even within a particular region, the composition can vary. Common to virtually all sources of crude oil is the existence of heteroatoms such as sulfur, nitrogen, nickel, vanadium and others. Some crude oils also contain naphthenic acid compounds. These impurities are present in quantities that impact the refinery processing of the crude oil and its fractions.

The term "naphthenic acid" is derived from the first observation of the acidity in naphthenic-based crude. The chemical compositions of naphthenic acids are extremely complex, and a great variety of structures and compositions fall within the classification of naphthenic acids. Naphthenic acids are predominantly made up of carboxylic cycloaliphatic acids substituted with alkyl, with lower proportions of non-cycloaliphatic acids. Aromatic, olefinic, hydroxylic and dibasic acids may be present as minor components. The molecular weight of naphthenic acids present in crude oils, as determined by mass spectrometry, varies generally between about 120 and more than 700 grams per mole. Presence of naphthenic acid compounds contributes to the acidity of crude oils and is one of the major causes of corrosion in oil pipelines and distillation units in oil refineries. Consequently, crude oils with high naphthenic acid concentrations are considered to be of poor quality and are marketed at a lower price.

Total acid number ("TAN") is a commonly accepted criterion for the oil acidity, although its correlation with corrosive behavior is still uncertain. Specifically, TAN represents the number of milligrams of potassium hydroxide required to neutralize the acidity of 1 gram of oil. Some crude oils possess extremely high levels of naphthenic acidity (e.g., oils which would require between 3 and 10 milligrams of potassium hydroxide per gram of oil in order to neutralize such acidity), and do not meet current material specifications of refineries. Metallurgic adequacy of industrial units is obtained by substituting equipment, metal pipes, etc., and is a function of naphthenic acid distribution in the oil fractions, which are subject to change in processing oils coming from new reservoirs.

The high acid content also influences the value and marketability of crude oil. For example, currently the market value is discounted for crude oil having a TAN greater than 0.5 milligrams potassium hydroxide per gram of oil.

Moreover, the polarized character of carboxyls promotes the formation of emulsions, especially in heavier hydrocarbon feedstocks. This reduces the efficiency of the desalination stage of petroleum, making the separation of the water/oil emulsions difficult. Therefore, high acidity not only reduces market value, but adversely affects the refining process.

Reducing TAN from refinery feedstocks is regarded as one of the most important processes in heavy oil upgrading. One approach is to mix feedstock having a relatively high TAN with a feedstock having a relatively low TAN. However, the acidic compounds remain in the blended feedstock, and the higher market value low TAN hydrocarbon feedstock is sacrificed. Other methods include washing a feedstock with a caustic solution. This treatment can remove naphthenic acids, but the process generates significant amount of wastewater and emulsions that are difficult to treat. Further approaches include adsorption of the naphthenic acid through adsorbent compounds with or without catalytic properties or contacting with other catalysts, including hydrotreating catalysts.

Nonetheless, a need remains in the industry for improved processes for treatment of refinery feedstocks to reduce the TAN, neutralize naphthenic acids, and/or break or prevent the formation of emulsions, in an efficient and economically feasible manner.

SUMMARY OF THE INVENTION

Accordingly, it is an object of the present invention to efficiently and economically reduce the TAN of a hydrocarbon feedstock containing naphthenic acids.

Another object of the present invention is to reduce the TAN while breaking emulsions or minimizing or preventing the likelihood of their formation.

In accordance with one or more embodiments, a process for reducing the TAN of a refinery feedstock containing naphthenic acids is provided. The refinery feedstock containing naphthenic acids is contacted with an effective amount of solid heterogeneous catalyst in the presence of an aqueous base for a period of time sufficient to neutralize at least a portion of the naphthenic acids in the feedstock to produce a treated mixture. The mixture is phase separated into an aqueous phase and a neutralized hydrocarbon phase.

In accordance with one or more additional embodiments, the process comprises contacting the hydrocarbon feedstock containing naphthenic acids with an effective amount of solid catalyst that has been pretreated with a caustic base for a period of time sufficient to neutralize at least a portion of the naphthenic acids in the hydrocarbon feedstock to produce a treated hydrocarbon feedstock having reduced amount of naphthenic acids.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. The accompanying drawing is included to provide illustration and a further understanding of the various aspects and embodiments, and is incorporated in and constitutes a part of this specification. The drawing, together with the remainder of the specification, serves to explain principles and operations of the described and claimed aspects and embodiments.

BRIEF DESCRIPTION OF THE DRAWING

The foregoing summary as well as the following detailed description will be best understood when read in conjunction with the attached drawing. It should be understood, however, that the invention is not limited to the precise arrangements and apparatus shown.

FIG. 1 is a process flow diagram of a system for reducing the TAN of a refinery feedstock.

DETAILED DESCRIPTION OF THE INVENTION

Referring to FIG. 1, a system 10 for reducing the TAN of a refinery feedstock is schematically illustrated. Details such as pumps, instrumentations, heat exchangers, boilers, compressors, and similar hardware have been omitted as being non-essential to understand the techniques involved in this invention. System 10 includes a neutralization vessel 4 and a separator drum 6. Neutralization vessel 4 includes an inlet 3 for receiving a hydrocarbon feedstock via conduit 1 and an aqueous caustic base via conduit 2, and an outlet 5 for discharging a treated mixture. Separator drum 6 includes an inlet 11 for receiving the treated mixture, an outlet 7 for discharging a neutralized hydrocarbon feedstock, an outlet 8 for discharging an aqueous phase, and an outlet 9 for discharging light gases. In certain embodiments, emulsion breaking additives can be incorporated in separator drum 6, e.g., via conduit 12 (shown in dashed lines).

In the practice of the system described herein, a hydrocarbon feedstock containing naphthenic acids introduced via conduit 1 is mixed with an aqueous caustic base introduced via conduit 2. The mixture is charged to the neutralization vessel 4 via inlet 3. Neutralization vessel 4 contains a single catalyst or a group of catalysts. The mixture is brought into contact with the catalyst and maintained in contact for a sufficient period of time to neutralize naphthenic acid compounds present in the hydrocarbon feedstock. The treated mixture is discharged via outlet 5 and passed to separator drum 6 via inlet 11.

The treated mixture is separated into three portions: a neutralized hydrocarbon feedstock having a reduced TAN by neutralization of naphthenic acids, which is recovered as product via outlet 7; an aqueous phase containing spent caustic base discharged via outlet 8; and light gases including $H_2S$, $NH_3$ and light hydrocarbon gases (e.g., having carbon numbers between 1 and 4) discharged via outlet 9.

In an additional embodiment the catalyst material contained in neutralization vessel is pretreated with a caustic base, such as sodium hydroxide or potassium hydroxide. In this embodiment, the caustic base and separator drum are not present.

The pretreatment of catalyst can be in situ (e.g., in a neutralization vessel) or ex situ (e.g., in a continuous tubular vessel or batch equipment). In an exemplary embodiment of in situ catalyst preparation, an alumina base catalyst is loaded into the neutralization vessel, and a 50 weight % caustic base solution is heated to 320° C. and fed through the catalyst bed at a liquid hourly space velocity of 0.3 $h^{-1}$ for 5 to 10 hours. After catalyst pretreatment, feedstock can be charged for neutralization of naphthenic acids. In an exemplary embodiment of ex situ preparation, an alumina catalyst in pellet form is heated to 320° C. in a batch vessel and then mixed with a 50 weight % caustic base solution for 3 hours. The caustic base solution is drained and the solid catalyst particles are dried and loaded into the neutralization vessel.

The refinery feedstock for use in above-described apparatus and process can be a crude or partially refined or fractions of hydrocarbon product obtained from various sources. The source of the refinery feedstock can be naturally occurring crude oil, synthetic crude oil, bitumen, oil sand, shale oil, coal liquids, or a combination including one of the foregoing sources. For example, the feedstock can be naphtha, gas oil, vacuum gas oil or other refinery intermediate stream such as vacuum gas oil, deasphalted oil and/or demetalized oil obtained from a solvent deasphalting process, light coker or heavy coker gas oil obtained from a coker process, cycle oil obtained from an FCC process, gas oil obtained from a visbreaking process, or any combination of the foregoing products. Nonetheless, one of ordinary skill in the art will appreciate that other hydrocarbon streams can benefit from the practice of the herein described system and method.

The aqueous caustic base can be sodium hydroxide or potassium hydroxide. In certain embodiments, the amount of caustic base supplied through conduit 2 is in the range of from 0.05 to 30 weight % based on the weight of the catalyst.

Neutralization vessel 4 can be a fixed, moving, fluidized, or swing bed system. In certain embodiments a fixed bed reactor is suitable. In general, the operating conditions of the neutralization vessel include a pressure in the range of from 1 to 20 $Kg/cm^2$, in certain embodiments from 1 to 10 $Kg/cm^2$; a temperature in the range of from 200° C. to 600° C., in certain embodiments from 300° C. to 400° C., and in further embodiments from 300° C. to 350° C.; and a liquid hourly space velocity of the refinery feedstock in the range of from 0.1 to 10 $h^{-1}$, in certain embodiments from 0.5 to 4 $h^{-1}$, and in further embodiments from 1 to 2 $h^{-1}$. In certain embodiments, pressure within the neutralization vessel can be maintained by the hydrocarbon pressure alone, without any supply of added overhead or blanketing gas.

The neutralization vessel contains catalysts having basic properties. In certain embodiments the catalyst comprises at least one metal oxide selected from the group consisting of zinc oxide, aluminum oxide, zinc aluminates, and layered double hydroxides including magnesium/aluminum. The catalyst is in the form of pellets, spheres, or any other suitable shape. Generally, catalyst particle size and shape are chosen, as is known in the art, in such a manner as to prevent undue pressure drop across the bed, yet permit adequate diffusion of reactants to active sites on the catalyst surface of within the catalyst particle.

In certain embodiments, demulsifier additives can be added to separator drum 6 to efficiently separate oil and water. These emulsion breaking additives may be selected from the group consisting of triethanolamine, ethoxylated phenol resins, zinc chloride and polymerized trithionylamine.

The process described herein can be conducted at various stages in refinery operations or upstream. For instance, the process can be implemented to treat influent feedstock in a refinery or fractions thereof. In alternative embodiments, the process can be implemented upstream of or within a gas oil separation plant, for instance, downstream of desalting stages.

The method and system herein have been described above and in the attached drawing; however, modifications will be apparent to those of ordinary skill in the art and the scope of protection for the invention is to be defined by the claims that follow.

The invention claimed is:

1. A process for reducing the total acid number of a refinery feedstock containing naphthenic acids, the process comprising:

contacting the refinery feedstock containing naphthenic acids at a liquid hourly space velocity in the range of from 0.1 to 10 $h^{-1}$ with an effective amount of solid catalyst in the presence of 0.05 to 30 weight % of an aqueous caustic base, based on the weight of catalyst, for a period of time sufficient to neutralize at least a portion of the naphthenic acids in the refinery feedstock to produce a treated mixture; and phase separating the treated mixture into an aqueous phase and a neutralized refinery feedstock.

2. The process of claim 1, wherein the solid catalyst is a single or a group of catalysts which exhibit basic properties.

3. The process of claim 1, wherein the solid catalyst comprises at least one metal oxide including one or more materials selected from the group consisting of zinc oxide, aluminum oxide, zinc aluminates, and layered double hydroxides including magnesium/aluminum.

4. The process of claim 1, wherein the aqueous caustic base is sodium hydroxide or potassium hydroxide.

5. The process of claim 1, wherein the refinery feedstock is supplied with a liquid hourly space velocity in the range of from 0.5 to 4 $h^{-1}$.

6. The process of claim 1, wherein the refinery feedstock is supplied with a liquid hourly space velocity in the range of from 1 to 2 $h^{-1}$.

7. The process of claim 1, wherein neutralization reaction is conducted at a temperature in the range of from 200 to 600° C.

8. The process of claim 1, wherein neutralization reaction is conducted at a temperature in the range of from 300 to 400° C.

9. The process of claim 1, wherein neutralization reaction is conducted at a temperature in the range of from 300 to 350° C.

10. The process of claim 1, wherein neutralization reaction is conducted at a pressure in the range of from 1 to 20 Kg/cm².

11. The process of claim 1, wherein the neutralization reaction is conducted at a pressure in the range of from 1 to 10 Kg/cm².

12. The process of claim 10, wherein the pressure is maintained by refinery feedstock pressure alone, without any supply of added overhead or blanketing gas.

13. The process of claim 1, which further includes adding an emulsion breaking additive to the treated mixture to minimize emulsion formation.

14. The process of claim 13, wherein the emulsion breaking additive is triethanolamine, ethoxylated phenol resins, zinc chloride, or polymerized trithionylamine.

15. The process of claim 1, wherein the refinery feedstock comprises crude oil.

* * * * *